United States Patent [19]

Tsuyama

[11] 4,034,971

[45] July 12, 1977

[54] CLAMP USABLE AS JIG AND LIFTING CLAMP

[75] Inventor: Yoshizo Tsuyama, Nara, Japan

[73] Assignee: Eagle Clamp Co., Ltd., Nara, Japan

[21] Appl. No.: 722,751

[22] Filed: Sept. 13, 1976

[30] Foreign Application Priority Data

Oct. 2, 1975 Japan .......................... 50-119249

[51] Int. Cl.$^2$ .......................................... B25B 1/10
[52] U.S. Cl. .............................. 269/249; 269/258; 269/261
[58] Field of Search ............ 269/249, 258, 261, 95, 269/254 CS; 294/101, 103

[56] References Cited

U.S. PATENT DOCUMENTS

2,867,003  1/1959  Stiles .................................. 269/249
3,947,011  3/1976  Tsuyama .......................... 269/249

*Primary Examiner*—Al Lawrence Smith
*Assistant Examiner*—Robert C. Watson
*Attorney, Agent, or Firm*—Kurt Kelman

[57] ABSTRACT

A screw clamp having a clamp body provided with a pair of leg portions defining a slot therebetween, a jaw comprising a screw rod disposed on one of said leg portions and adapted to be advanced into or retreated from the slot, and a swivel jaw oppositely disposed on the other leg portion and adopted to be swiveled wherein either one of said jaws are resiliently mounted on the associated leg portion by means of a spring for providing friction between the thread surfaces of the screw rod and its mating threaded hole to thereby prevent the screw rod from being loosened under the influence of unintentional external force such as vibration.

6 Claims, 7 Drawing Figures

CLAMP USABLE AS JIG AND LIFTING CLAMP

BACKGROUND OF THE INVENTION

This invention relates to new and useful improvements in clamps which are well suited not only for lifting heavy articles such as hull blocks in a shipyard or steel plates or sub-assemblies of a bridge or a building in a construction field, but also well suited for use as a pulling jig for pulling and holding articles in desired relative position for welding, bolting or riveting them together in such construction fields.

There has been known many types of clamps which are suited to be used in such fields mentioned in the above. One of the types of such clamps is a screw type which typically comprises a clamp body having a shackle for engagement with a pulling or lifting devices and a pair of leg portions integrally disposed on said body and forming a slot therebetween for receiving an article to be clamped, and at least a movable jaw comprising a screw rod movable to be advanced into and retreated from the slot for gripping or releasing an article within the slot.

In such type of clamps, it is desirable to provide means for preventing an article clamped from being slipped out of the clamp during operation, since it is often difficult to tighten the screw rod enough to hold the article or to confirm whether or not the screw rod has been tightened sufficiently to prevent the article from being slipped out when the clamp is lifted or pulled.

There has been proposed some solutions for this problem, for example U.S. Pat. No. 3,269,766; entitled "Screw Clamp with a Head having a Reverse-Acting and Renewable Gripping Surface"; granted to Mr. Edward Merril Gardner, and U.S. Pat. No. 3,947,011; entitled "Clamp Usable as Jig and Lifting Clamp"; granted to the same inventor of the present application.

In the clamps disclosed in these patents, there is provided a slidably and rotatably mounted gripping pad or a swivel jaw having a convex gripping surface which functions to provide a powerfully-wedged gripping action by the rotational movement of the gripping pad or swivel jaw when the clamp is lifted or pulled and the article gripped shows a tendency to be slipped out of the clamp.

However, there has been found a defect in these clamps that even though the article to be calmped is once firmly gripped, the screw rod often shows a tendency to be loosened due to a certain external force, for example, by vibration when such a force is applied to the clamp under a condition where no load is applied to the clamp or the article is gripped for a considerably long time.

Like phenomena are generally experienced in bolt and nut engagement. More specifically, bolt and nut engagement can maintain its locking or tightening condition when friction force between screw threads thereof is sufficient for preventing the nut from being loosened, but once a force for producing this friction is reduced to a certain extent, the nut tends to easily fall off the bolt by vibration.

In order to prevent the screw rod from being loosened, it may be thought that the lead angle of the screw to be formed in the rod should be rendered as smaller as possible, that is, a pitch should be maintained smaller so that the screw rod may resist an external force such as vibration, etc. However, in order to render the lead angle small, an angle of the screw thread (i.e. an angle between adjacent flanks of the screw threads) should consequently be maintained smaller, and this reduction of the angle of the screw thread is limited to a certain extent for bearing the load to be imposed upon the screw thread.

In fact, this loosening phenomenon has been observed, even in a clamp which is prepared in such a manner that the screw rod has a minimum angle of the screw thread in the light of the strength for bearing the load to be imposed upon the screw thread.

Therefore, it is a principal object of the present invention to provide a clamp which may ensure to prevent unintentional disengagement between the clamp and the article to be clamped irrespective of the clamp being applied a load or not.

Another object of the present invention is to provide a screw type clamp which is capable to prevent the screw rod from being loosened with the influence of unintentional external force such as vibration.

Still another object of the present invention is to provide a new and useful arrangement of a clamp which arrangement applicable not only to a lifting clamp and pulling jig, but also applicable to a connecting jig for fixing a free end of a safety rope appendant to a safety belt which is required by persons who work at high places for preventing them from falling down accidents.

SUMMARY OF THE INVENTION

The present invention contemplates to provide a new and useful arrangement of a clamp usable as a lifting clamp and as a pulling jig for handling heavy articles and also as connecting jig for fixing a free end of a safety rope connected to a safety belt.

More specifically, the present invention relates to provision of a clamp having a pair of jaws on a pair of leg portions of a clamp body wherein one of the jaws consists of a screw rod which is movable on one of leg portions to be advanced into and retreated from a slot formed between said pair of leg portions, and the other jaw consists of a swivel jaw which is universally swingable on the other leg portion and capable to cause wedged gripping function when it is swung or swiveled on the other leg portion, wherein either one of said jaws is resiliently mounted on the associated leg portion by means of a spring, whereby either one of the jaws is always biased towards the slot so as to give sufficient friction between the thread surfaces of the screw rod and its mating threaded member for preventing the screw rod from being loosened under the influence of unintentional external force such as vibration.

The foregoing and other objects, features and advantages of the present invention will become readily apparent from reading the following detailed description taken in conjunction with the accompanying drawings.

DESCRIPTION OF THE PREFERRED EMBODIMENT

Figure 1:
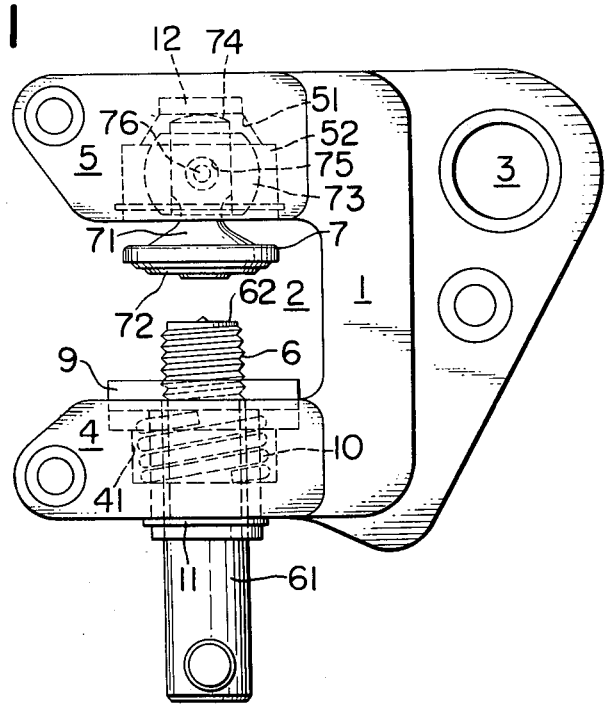
FIG. 1 is a front view showing a clamp according to an embodiment of the present invention, wherein a screw rod is resiliently mounted.

Referring now to the drawings, the clamps illustrated generally include a practically C shaped clamp body 1 comprising a base portion and a pair of leg portions 4 and 5 integrally connected to the base portion at the one end thereof. A slot 2 for receiving an article or a steel plate to be clamped (not shown) is defined between said leg portions, and a shackle 3 for engagement with a pulling device (not shown) is integrally formed with the clamp body at the base portion. It should be noted that a shackle 3 may be located at any suitable position of the clamp body 1.

The clamp provided with a shackle 3 at the position illustrated is generally used in place of an eye-piece which is employed to adjust the relative position of articles to be handled such as steel frames, steel plates or subassemblies used in the construction and assembling of a building, bridge or ship for welding, bolting or riveting them together.

However, the illustrated clamp is also usable as a lifting clamp, and if necessary, the position of the shackle 3 may be changed in different ways to use it as a lifting clamp for specific use.

There is provided a pair of opposed jaws 6 and 7 which are respectively mounted on the leg portions 4 and 5 to grip an article received in the slot 2.

Of the pair of jaws, the jaw 6 mounted on the leg portion 4 consists of an article locking screw rod 61 which is adopted to be advanced into and retreated from the slot.

The end face of the screw rod 61 that faces the slot 2 is a gripping surface 62 on which is formed with a conical protrusion and at least a circular protrusion concentrically arranged therewith for biting into a surface of the article. In case a plurality of circular protrusions are provided, those are therefore arranged substantially in concentric manner. The tip end of said conical protrusion is formed slightly higher and sharper than circular protrusions thereby, when the screw rod 61 is advanced to lock an article in the slot 2, said conical protrusions contact and bite first into the surface of the article and act as a fulcrum to allow the screw rod 61 to turn smoothly around the conical protrusion and to prevent the gripping surface of the turning screw rod from rambling or travelling around on the surface of the article here and there.

The other end of the screw rod 61 that extends through the leg portion and projects to the outside of the clamp body 1 is formed with a hole 63 into which is inserted a handle bar 8 which is turned by an operator with his hands to advance the screw rod 61 into the slot or retreat it therefrom.

Disposed opposite to the jaw 6 consisting of the screw rod 61 is a swivel jaw 7 on the opposite leg portion 5. This swivel jaw 7 generally comprises a gripping member 71 having a cylindrical body portion and an integral flared gripping head portion, and a swivel ring 73 having a spherically convex surface. Said ring 73 is provided with a cylindrical void or a bore into which said cylindrical body portion of the gripping member 71 is slidably inserted.

A laterally extending through hole 75 is provided at the cylindrical body portion of the gripping member 73, and a pin 76 extending through said lateral hole is threadedly secured to the ring 73 thereby the gripping member 71 is slidably interconnected with said ring 73. The pin 76 has a relatively smaller diameter with respect to the inner diameter of the through hole 75, and this defines the limitation to the sliding movement of the gripping member 71 with respect to the ring 73.

The gripping member 71 is mounted on the leg portion 5 by means of a socket member 52 having a cylindrical outer surface and a spherical concave inner surface which forms a complementary surface with respect to the spherical convex outer surface of the ring 73. Said socket member 52 may be vertically split with a plane which extends through the center points of the opposite openings of the void of the ring 73, and is separable into two halves so as to receive the spherical convex outer surface of the ring for permitting its rotational movement within the socket which in turn accommodated in the cylindrical recess 51 formed on the leg portion 5. The socket member 52 may be locked within the recess 51 by suitable fixing means such as bolt (not shown) externally secured thereinto through the leg portion 5.

It will be understood that the gripping member 71 and the swivel ring 73 is assembled for permitting limited sliding motion therebetween and the thus assembled swivel jaw is received in the socket 52 for permitting rotational motion with said ring and said socket.

The gripping head is provided on its flared free end with a convex gripping surface on which a plurality of concentrically arranged circular protrusions 72 are provided. The convex gripping surface of the gripping head is designed in such a manner that the radious extending from the center of rotation of the swivel jaw 7 to a point on the gripping surface gradually increases when the point is displaced from the center of the surface towards its periphery, thereby when the swivel jaw 7 is rotated on the socket, the gap between the convex gripping surface and the gripping surface of the screw rod 61 is narrowed. In other words, when an article gripped between the jaws tends to slip out, the swivel jaw 7 is rotated and pressed against the article with increased urging force due to the increasing of the radius extending from the center of rotation of the swivel jaw to the point on the gripping surface at which the article is contacted, to thereby prevent the article from slipping out from the clamp.

On the opposite end of the cylindrical body portion of the gripping member 71, there is provided a cam surface which is also designed in such a manner that the radius from the center of rotation of the swivel jaw to a point on the cam surface is minimum when the point is located at the center thereof, and gradually increases when the point is displaced towards the periphery thereof. Disposed at the bottom of the recess 51 of the leg portion 5 is a thrust member 12 (12' in FIGS. 4 and 5) which provides sliding contact surface for the cam surface of the gripping member 71. Thus the swivel jaw is urged towards the slot 2 when it is rotated in the socket 51 while the cam surface is contacted with the thrust member. More precisely, an article gripped tends to slip out of the jaws, the swivel jaw 7 is rotated while the cam surface is contacted with the thrust member 12 (12'), and this causes the gripping member 71 to be urged to the slot 2 sliding in the ring 73, thereby increased gripping force is applied to the article which in turn produces increased friction force on the threads of the screw rod 61 and its mating threaded hole.

In accordance to the present invention, of the pair of jaws formed in the manner mentioned in the above, either one is resiliently mounted on the associated leg portion of the clamp body 1 by means of a spring.

Figure 2:
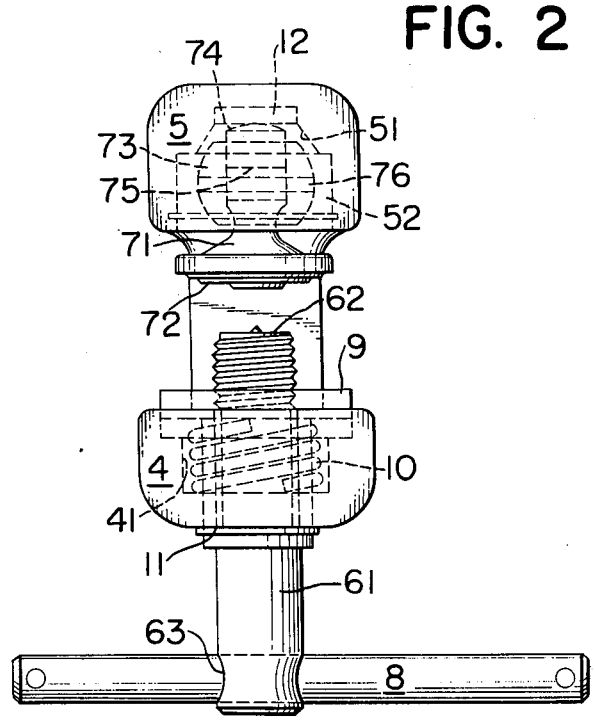
FIG. 2 is a side view of the clamp shown in FIG. 1.
Figure 3:
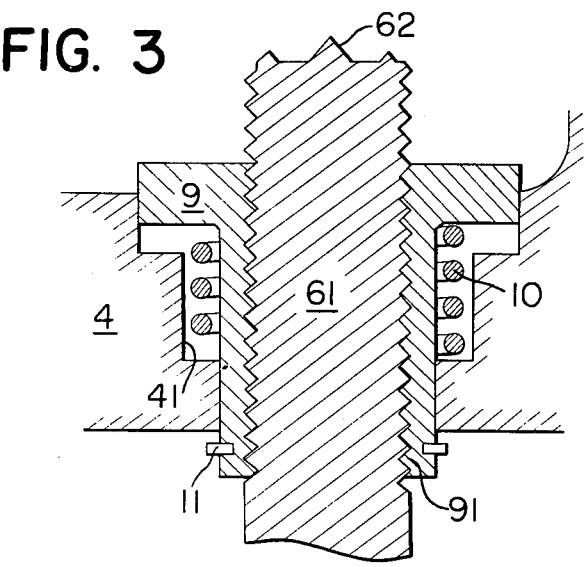
FIG. 3 is a partially enlarged sectional view of the clamp shown in FIG. 1.

Referring now particularly to FIGS. 1-3, there is shown an embodiment of a clamp in accordance with the present invention in which a screw rod is screwed into a sleeve 9 which in turn is slidably and resiliently mounted on a leg portion 4 by spring means 10.

Said sleeve 9 has a T shape in cross section, for example, it comprises a cylindrical body portion and a collar portion having an enlarged diameter on one end of the body portion, and is provided with a through hole or bore along its axial direction into which hole the screw rod 61 is screwed.

On the leg portion 4, there is provided a hole 41 which is extending from its inner side facing to said slot 2 to its opposite outer side. Said hole 41 generally comprises three portions, a portion having an enlarged diameter for slidably receiving the collar portion of the sleeve 9 at its inner end adjacent to the slot 2, a portion having a reduced diameter for slidably receiving the cylindrical body portion of the sleeve 9 at its opposite outer end, and a portion having an intermediate diameter therebetween.

As will be seen from the FIGS. 1-3, there is provided a shoulder portion between the enlarged hole portion and the intermediate hole portion and a second shoulder portion between the latter portion and a reduced hole portion. The dimension of the sleeve 9 in the axial direction is such that, when the sleeve 9 is inserted into the hole 41 from the inner side until the collar portion is stopped by said first shoulder, said cylindrical body portion of the sleeve 9 is extended through and projected from the outer side of said leg portion 4. Disposed on the body portion projecting from the outer side of said leg portion 4 is a stopper 11 which may be a stop ring. The stopper 11 and the first shoulder provide limitation of the sliding movement of the sleeve 9.

Spring means 10 is accommodated within the gap formed between the outer side of the cylindrical body portion of the sleeve 9 and the inner wall of the intermediate hole portion of the hole 41 and is compressed between the collar portion of the sleeve 9 and the second shoulder of the hole 41. Thus the sleeve 9 with the screw rod 61 screwed into the sleeve is constantly biased towards the slot 2.

It will be easily understood that it is necessary to provide means for preventing the sleeve 9 from being rotated in the hole 41 along with the screw rod 61, when the screw rod is screwed with respect to the sleeve 9. Though such means are not shown in the drawings, but the sleeve is inhibited its rotation by any suitable arrangement. For example, slot and pin arrangement, that is, an elongated slot which is formed on the outer side of the sleeve 9 and extending along its axial direction, and a pin which is provided on the leg portion 4 and extending into the slot can be utilized. Alternatively, the cylindrical sleeve 9 may be modified to polygonal sleeve 9 for inhibiting rotational movement by allowing sliding movement.

Now it will be understood that the screw rod jaw 6 is mounted on the leg portion 4 intermediately with the sleeve 9 which is always biased towards the slot 2.

When an article is desired to be gripped by the clamp shown in FIGS. 1-3, the screw rod 61 is advanced towards the slot 2 by rotating the handle bar 8 in clockwise direction so as to cause the gripping surfaces of the pair of jaws to contact with the opposite surfaces of the article. Further advancing movement of the screw rod 61 will cause the spring 10 to be compressed against its biasing force until the collar portion of the sleeve 9 is stopped with the first shoulder of the recess 41. Still further advancing movement of the screw rod makes the projections provided on each of the gripping surfaces of the jaws to bite into the opposite surfaces of the article and thus the article is securely gripped.

After the article is once securely gripped, when the shackle is pulled or lifted and the article tends to slip out of the clamp, the article is pressed between the jaws by the wedged gripping action of the swivel jaw due to the rotational movement of the swivel jaw, and this pressure produces sufficient friction between the thread surfaces of the screw rod and its mating threaded sleeves, thereby the screw rod is prevented from being loosened. However, when the shackle is not pulled or lifted, i.e., no load is applied to the clamp, this wedged gripping action cannot be utilized. During this no load condition, if the gripping force acting between the gripping surfaces of the jaws and the contacting surfaces of the article is reduced, friction between the thread surfaces tends to decrease. This may happen in case that the surface areas of the article is deformed along with the gripping surfaces of the jaws and loose its restoration force. However, the biasing force of the spring 10 provides sufficient friction for preventing the screw rod being loosened by vibration. Referring now to the FIGS. 4-6, there are shown other embodiments of this invention in which the swivel jaw 7 is resiliently supported on the leg portion 5, and the screw rod is directly mounted on the leg portion 4.

Figure 4:
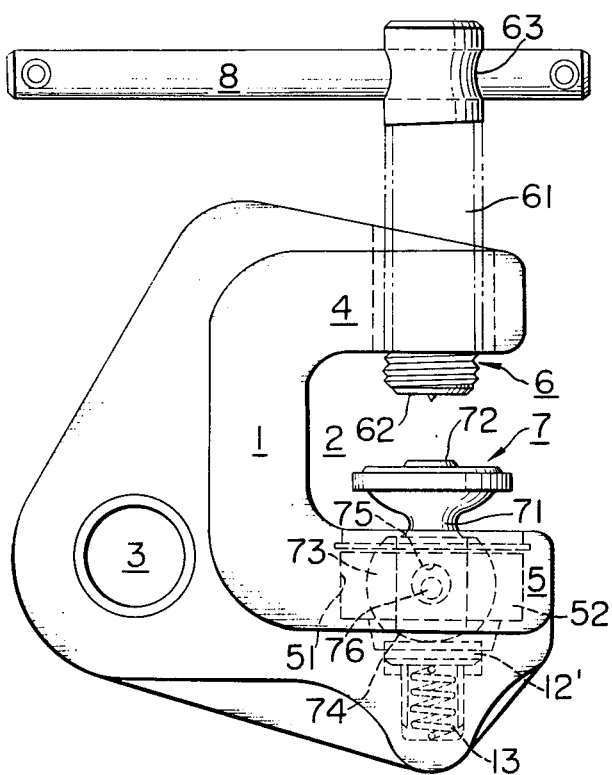
FIG. 4 is a front view showing a clamp according to another embodiment of the present invention, wherein a swivel jaw is resiliently mounted.
Figure 5:
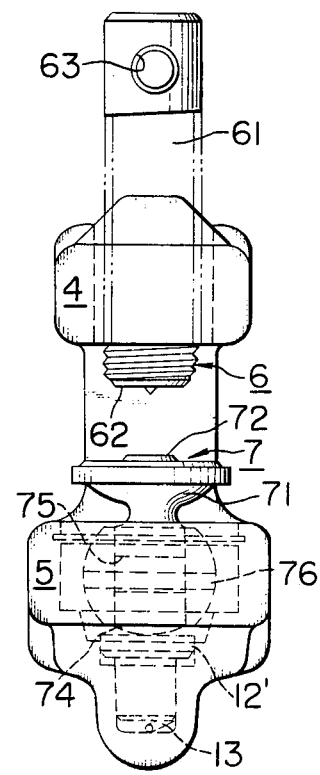
FIG. 5 is a side view of the clamp shown in FIG. 4.

Referring particularly to FIGS. 4 and 5, a swivel jaw 7 and its associated elements are the same to those generally described and shown in FIGS. 1-3, except that the thrust member 12' is shaped in rivet like cross section and is resiliently supported by means of spring 13.

The thrust member 12' includes a body portion having a hole therein for receiving one end of a spring 13 and a head portion providing with a sliding contact surface for the cam surface of the gripping member 71. At the bottom of the recess 51, a second recess is formed for slidably receiving said body portion of the thrust member 12'. Preferably the diameter of the second recess is smaller than that of the first recess for providing a shoulder on which the bottom surface of the socket 52 is rest. It will be understood that for assembling the swivel jaw 7 on the leg portion 5, the thrust member 12' having a spring 13 in its hole is first placed in the second recess, then the swivel jaw 7 received with the socket 52 which are completely the same with those in the previous embodiments illustrated in FIGS. 1-3 are mounted in the recess 51 in the same manner as previously described. Finally the socket 52 is locked by suitable fixing means such as bolts (not shown) externally screwed thereinto through the leg portion 5 to thereby prevent those from slipping out from the recess 51.

Figure 6:
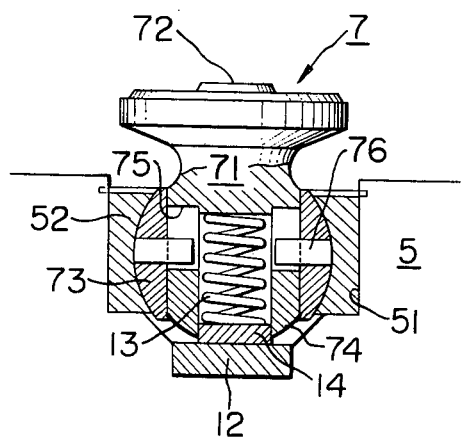
FIG. 6 is an enlarged fragmental view of a modified embodiment of the clamp shown in FIGS. 4 and 5 showing the swivel jaw and its peripheral portions.

FIG. 6 illustrates a modified form of the embodiment shown in FIGS. 4-5. This embodiment is substantially the same with the embodiment of FIGS. 4-5 except that the gripping member 71 proper is spring biased instead of that the thrust member 12' is spring biased in the embodiment of FIGS. 4-5. More specifically, the gripping member 71 is provided with a hole in its cylindrical portion along its axial direction for receiving a spring 13 therein. Denoted with a reference numeral 14 is a spring shoe which is slidably inserted into the hole. In addition, in the embodiment illustrated in FIG. 6, the pin 76 for restraining the gripping member 71 to the ring 73 is replaced with two stubs 76 which are threadedly secured to the ring 73 on the opposite sides of the ring and are extending into the holes locating on the opposite sides of the cylindrical portion of the gripping member so as to allow limited relative sliding movement between the gripping member and the ring.

All the remaining aspects of this embodiment are quite the same as mentioned with respect to those of the embodiment of FIGS. 4-5.

With the thus constructed clamp in accordance with this invention, when an article is not gripped between the jaws within the slot area 2, either one of the jaws, i.e., the screw rod 6 with the sleeve 9 or the gripping member 71, is biased towards the another jaw by virtue of the spring 10 or 13.

In use, an article is inserted into the slot 2 and the screw rod 61 is advanced to the article by turning the handle bar 8. When the gripping surfaces of the jaws contact with the article on its opposite surfaces, the sleeve 9 (in case of he embodiment of FIGS. 1-3) or the gripping member 71 (in case of the embodiment of FIGS. 4-5 or FIG. 6) begins to be forced to back, causing the spring 10 or 13 to be compressed, until the collar portion of the sleeve 9 is engaged with and stopped by the shoulder portion of the recess 41 (in case of FIGS. 1-3), or until the head portion of the rivet like thrust member 12' is engaged with and stopped by the shoulder portion of the second recess (in case of FIGS. 4-5), or until the rear end convex surface 74 of the gripping member 71 is engaged with and stopped by the thrust plate 12.

When the screw rod 61 is further advanced, the conical and circular protrusions of the gripping surfaces 62 and 72 begin to bite into the opposite surfaces of the article and the advance movement of the screw rod 61 is stopped when the gripping surfaces sufficiently contact with the article and the locking force of the jaws and its reaction force of the article are balanced. In this locking condition, restoration force of the article may give sufficient friction between the threads of the screw rod and its mating hole for preventing the screw rod from being loosened.

Such a locking condition of the screw rod has been continued for a long time, the contacted and gripped surfaces of the article are often deformed and come to be concaved along the gripping surfaces of the jaws. However, in the clamp according to the present invention either the screw rod type jaw 6 or the opposed swivel jaw 7 is resiliently mounted by means of the spring 10 or 13, and even when the gripped surfaces of the article with the jaws are caved, the jaw 6 or 7 is always forced to the article. As the result the screw rod 61 always pressed between the article and the sleeve 9 (in case of the embodiment of FIGS. 1-3) or the leg 4 (in case of the embodiments of FIGS. 4-5 or 6), so that a sufficient friction force acts on the screw threads of the rod 61 and its mating hole to prevent the screw rod from being loosened.

It will thus be seen from the foregoing that the present invention provides an improved arrangement for a screw rod type clamp which has increased reliability and is well suited for use as a pulling jig, a lifting clamp or a connecting jig for fixing one end of safety rope.

Figure 7:
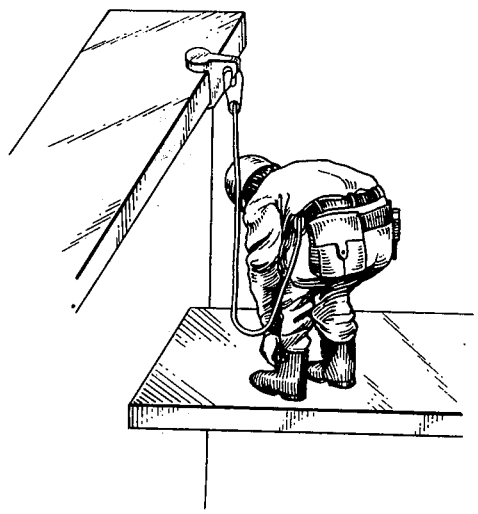
FIG. 7 is a schematic diagram showing an example wherein the clamp according to the present invention is used as a connecting jig for fixing a free end of a safety rope connected to a safety belt to a suitable supporting construction.

FIG. 7 schematically shows a manner in which a clamp in accordance with the present invention is used as a connecting jig for fixing one end of a safety belt rope to a suitable supporting construction in order preventing the worker at a high work place from falling down. In this case, to the shackle 3 of the clamp is fastened to a hook which is secured to the free end of the rope appendant to the safety belt, and the safety belt is wound round the worker's body. Since the worker must carry the safety belt rope having the clamp at its one end to the work place, the clamp for usable as a jig for fixing safety belt rope is preferable to be small in size and light in weight. When the worker reaches his work place, he can easily fix the clamp to a suitable place, for example, a steel plate of the scaffolding as illustrated in FIG. 7.

It will be understood that a fixing jig for a safety belt rope is usually applied to no load, and it cannot be expected that no vibration is subjected to the fixing jig at a shipyard or various construction fields. If a conventional screw rod type clamp is used as a fixing jig for a safety belt rope in such condition, screw rod is very likely to be loosened. Therefore, it will be understood that the arrangement of a clamp in accordance with this invention is well suited for use as a fixing jig for a safety belt rope having excellent high reliability.

The clamp in accordance with this invention is preferably made of aluminum alloy and made in small size when it is used as a fixing jig for a safety belt rope, whereas when it is intended to be used for pulling jig or a lifting clamp, it is preferably made of steel materials and in large size.

While only a few embodiments of this invention have been described, it will be appreciated by those skilled in the art that various modifications can be made thereto without departing from the spirit of the invention and the scope of the appended claims, for example, the socket 52 may be resiliently received in the slot 51 by means of spring.

What is claimed is:

1. A clamp of the type having a clamp body comprising a shackle for engagement with a pulling means and a pair of leg portions defining a slot therebetween for receiving an article to be gripped, a first jaw consisting of a screw rod mounted on one of the leg portions for movement into and out of the slot, a sleeve having a threaded hole in its axial direction, the screw rod threadedly mating with the sleeve, the sleeve being received in a hole formed in the one leg portion for allowing the sleeve to be advanced into and retracted from the slot but preventing the sleeve from being rotated, a second jaw consisting of a swivel jaw oppositely mounted on the other one of the leg portions for swiveling movement thereon, and precompressed spring means arranged within a gap formed between the inner wall of the hole of the one leg portion and the outer wall of the sleeve for biasing the sleeve towards the slot whereby friction force between the threaded surfaces of the screw rod and its mating threaded hole is increased when an article is gripped between the jaws.

2. A clamp in accordance with the claim 1, wherein
   a. said sleeve comprises a substantially cylindrical body portion and a collar portion having an enlarged diameter at its slot side end,
   b. said hole extends entirely through said one leg portion from its inside surface facing said slot to its opposite outer side surface, and comprises a first portion having an enlarged diameter for slidably receiving said collar portion of said sleeve at its inside end, a second portion having a reduced diameter for slidably receiving said cylindrical body portion of said sleeve at its opposite outer end and a third portion having a medium size diameter therebetween, and
   c. said spring means is arranged within said gap formed between said third portion of said hole and said sleeve, and compressed between shoulders formed at the transitional area of said first, second and third portions of said hole, thus biasing said sleeve towards said slot.

3. A clamp in accordance with the claim 2, wherein
   a. said sleeve is provided with a stopper on its outer end, and
   b. said stopper and said collar portion of the sleeve defines maximum sliding movement of the sleeve.

4. A clamp of the type having a clamp body comprising a shackle for engagement with a pulling means and a pair of leg portions defining a slot therebetween for receiving an article to be gripped, a first jaw consisting of a screw rod mounted on one of the leg portions for movement into and out of the slot, a second jaw consisting of a swivel jaw oppositely mounted on the other one of the leg portions for swiveling movement thereon, the second jaw comprising a gripping member having a substantially cylindrical body portion and a ring member connected therewith for allowing limited relative sliding movement in a hole formed in the ring member and the swivel jaw being mounted in a recess in the other leg portion, with a socket rotatably supporting the ring member on the swivel jaw, and a precompressed spring arranged in the recess in the other leg portion for biasing the gripping member towards the slot whereby friction force between the threaded surfaces of the screw rod and its mating threaded hole is increased when an article is gripped between the jaws.

5. A clamp in accordance with the claim 4, wherein
   a. said gripping member comprises a gripping head at its one end and a cam surface at its other end, and further comprising
   b. a thrust member having a hollow body portion for receiving one end of said spring, and a flat top surface for providing a sliding contact surface for said cam surface
   c. said thrust member is slidably received at the bottom of the recess formed in said other leg portion, and
   d. said spring is received in said hollow portion of the thrust member at its one end and compressed between the closed end of said hollow portion and the bottom of said recess, thus biasing the gripping member towards said slot with said thrust member.

6. A clamp in accordance with the claim 4, wherein
   a. said gripping member comprises a gripping head at its one end, a cam surface at its other end and a cavity having an opening at the center of said cam surface, and
   b. said spring means is received in said cavity of said gripping member and is compressed between the closed end of said cavity and the bottom of said recess of the other leg portion, thus biasing said gripping member towards said slot.

* * * * *